PHONOGRAPH

Filed July 25, 1960 2 Sheets-Sheet 1

Inventors:
WOLFGANG HASSELBACH
ANTON BAUER
HERMAN SCHERER

BY Michael S. Striker
ATTORNEY

PHONOGRAPH

Filed July 25, 1960 2 Sheets-Sheet 2

Inventors:
WOLFGANG HASSELBACH
ANTON BAUER
HERMANN SCHERER

BY Michael J. Striker
ATTORNEY

United States Patent Office 3,027,164
Patented Mar. 27, 1962

3,027,164

PHONOGRAPH

Wolfgang Hasselbach, Koenigstein, and Anton Bauer and Hermann Scherer, Frankfurt am Main, Germany, assignors to Firma Max Braun, Frankfurt am Main, Germany Filed July 25, 1960, Ser. No. 45,080
Claims priority, application Germany Sept. 23, 1959
19 Claims. (Cl. 274—9)

The present invention relates to phonographs in general, and more particularly to a phonograph or recording device whose tone arm is completely enclosed by the casing and whose tone head is adapted to engage the underside of a record. The improved phonograph may be utilized for the playing of permanent records, e.g. commercial disk records, as well as for recording and reproducing intelligence stored on magnetic disk-like carriers.

In many presently known phonographs, a rigid tone arm for the magnetic or needle type pickup is mounted at the upper side of the casing. Such construction increases the overall height of the apparatus which is particularly undesirable in phonographs or recording device of the portable type which should be as compact as possible. According to another proposal, the tone arm is movable into an operative position above the upper side of the casing and may be placed into a depression when the phonograph is not in use. Though such construction reduces the overall height of the phonograph, it is much more expensive because the mounting of the arm requires a large number of precision-finished parts and several cushioning springs to prevent damage to the tone head.

It is also known to construct the tone arm in such a way that it may be swung about its longitudinal axis into an inoperative position adjacent to and at a level below the level of the turntable. Such construction is less expensive and brings about considerable reduction in the overall height, but the tone head remains exposed when the apparatus is not in use which is particularly undesirable in portable phonographs. Therefore, such phonographs must be provided with a removable cover which is placed over the exposed tone head during transportation or non-use of the device. The attempts to construct a portable phonograph in such a way that the disk record is inserted through a lateral slot have met with limited success because the casing is too bulky in that it must cover not only the tone head but also the turntable and a portion of the record.

An important object of the present invention is to provide a very compact phonograph or recording device of small height in which the tone arm is completely enclosed by the casing and in which the tone head projects from the casing only when the phonograph is in actual use.

Another object of the invention is to provide a phonograph in which all movements of the tone arm and of the tone head may be carried out in a fully automatic way.

A further object of the instant invention is to provide a phonograph of the above outlined characteristics wherein the driving motor may be started and arrested in a fully automatic way and in which the driving connection between the motor and the turntable may be interrupted when the phonograph is not in use.

A concomitant object of the invention is to provide a phonograph in which a disk record is automatically retained in required position when placed onto the turntable and in which the tone arm and its tone head remain concealed not only in idle position but also during actual use of the device.

Still another object of the present invention is to provide a casing for a portable phonograph or recording device of the above outlined characteristics whose height depends solely on the dimensions of the driving motor for the turntable, i.e. whose height is not increased even though the tone arm is permanently mounted in its interior.

An additional object of the invention is to provide an improved shutter for a phonograph or a recording device of the above outlined characteristics which is constructed and mounted in such a way that it can perform a number of controlling functions in addition to exposing and sealing the opening through which the tone head may extend into operative engagement with the underside of a record.

With the above objects in view, the invention resides in the provision of a sound recording or sound reproducing device, hereinafter called phonograph, preferably of the portable type, whose comparatively flat casing comprises an upper wall which is formed with an opening and mounts a small turntable adjacent to the opening so that a record placed onto the turntable overlaps the opening and may be engaged by the upwardly pivotable magnetic or needle-bearing tone head of a tone arm which is mounted at the underside of and is pivotable in a plane parallel with the upper wall of the casing, whereby the tone head is free to follow the grooves in the underside of a disk record. The casing contains a motor connectable with a battery which is also installed in the casing, and preferably comprises a shutter which may be operated by hand to alternately expose or seal the opening in the upper wall. The underside of the shutter is provided with a series of cams which perform various controlling operations, such as moving the tone arm in a plane beneath the upper wall between an operative position and an inoperative position, starting the motor for the turntable, depressing the tone head into the casing when the playing of a record is completed, as well as moving the motor from operative engagement with the turntable when the apparatus is not in use.

Certain other features of the invention reside in the provision of means for automatically retaining a disk record on the turntable so that the record may resist the pressure exerted against its underside by the spring-biased tone head, in the provision of specific switch means which may be operated by the shutter and the tone arm in order to start or to arrest the motor, in the provision of specifically constructed cams on the underside of the shutter, in the provision of a friction drive which transmits rotary motion of the motor to the turntable, in the provision of a specifically constructed two-piece tone arm whose components may perform limited movements with respect to each other such as may become necessary for the playing of a fluttering or distorted disk record, and in the provision of a specific mounting for the motor so as to reduce the likelihood of damage to the motor when the casing of the improved phonograph is subjected to rough handling.

In its preferred form, the improved phonograph is utilized in connection with 12-inch disk records. Its casing may be slightly enlarged to accommodate a small transistor radio, or it may be connected with a radio which is installed in a separate housing. Suitable handgrip means, such as a stirrup-shaped belt or the like, may be fixed to the outer side of the casing to facilitate transportation.

The novel features which are considered as characteristic of the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

Figure 1:
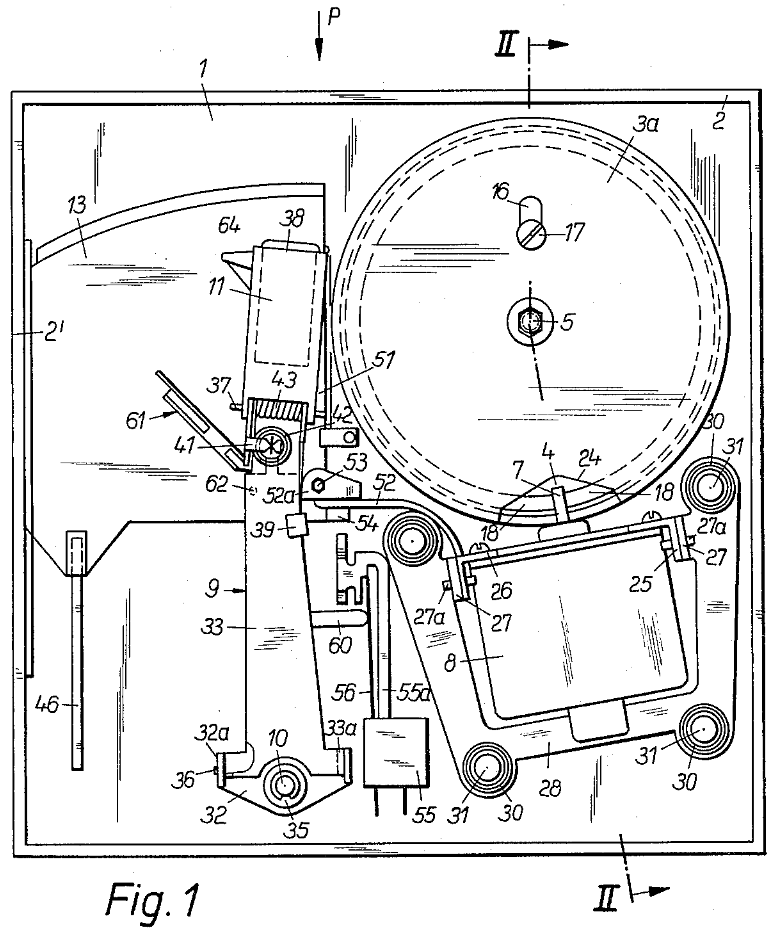
FIG. 1 is a bottom plan view of the upper wall of the phonograph casing showing the pivotable motor for the turntable and the tone arm in the latter's innermost position when the playing of a disk record is completed or when the phonograph is not in use.
Figures 2, 3, 5, 7:
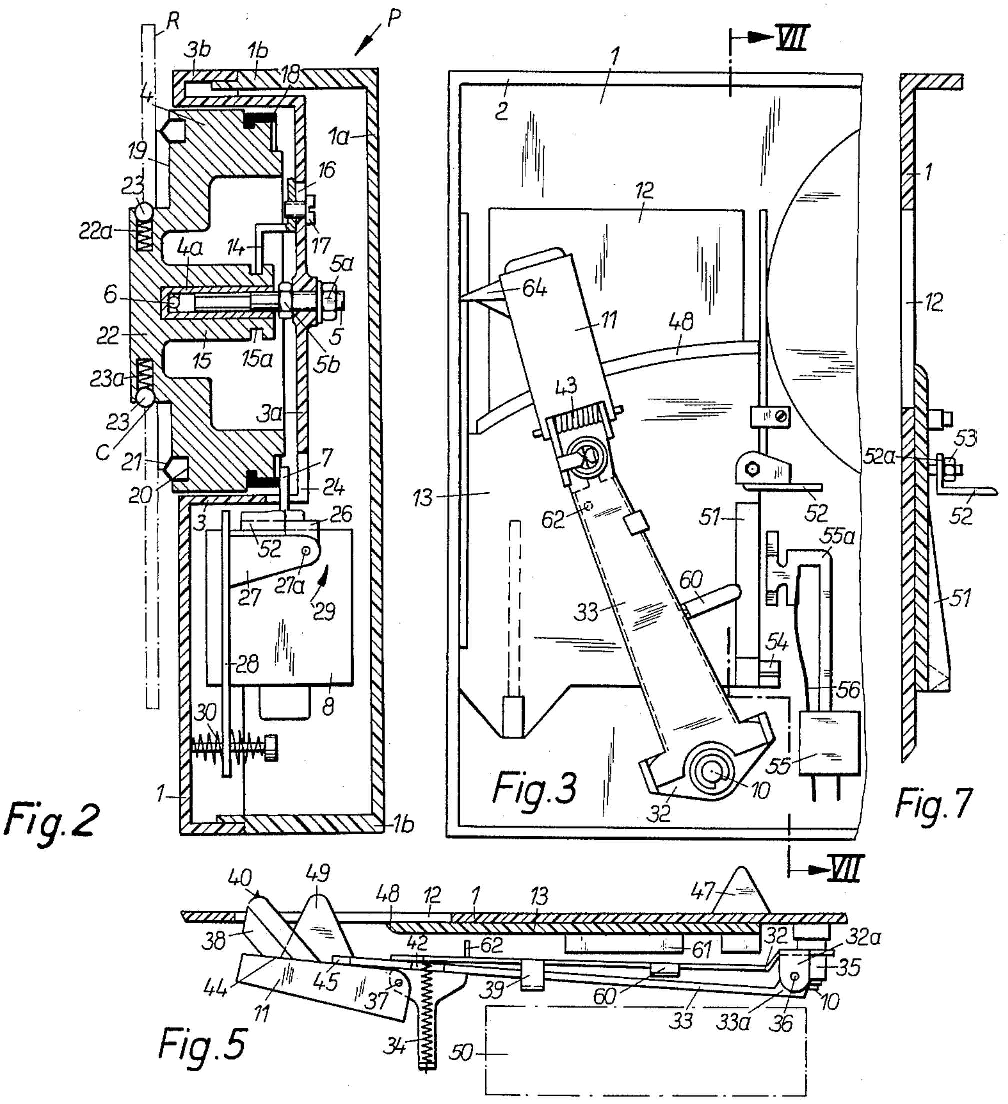
FIG. 2 is a transverse section taken along the line II—II of FIG. 1, as seen in the direction of arrows.
FIG. 3 is a fragmentary detail view of the arrangement illustrated in FIG. 1, showing the tone arm in the outermost position when the phonograph is about to be put to use.
FIG. 5 is a side elevational view of the tone arm in operative position in which its disk record contacting means extends upwardly through the sealable opening in the cover of the phonograph casing.
FIG. 7 is a transverse section taken along the line VII—VII of FIG. 3, as seen in the direction of arrows, showing the shutter in a position in which it exposes the opening in the upper wall of the phonograph casing.

Referring now in greater detail to the illustrated embodiment, and first to FIGS. 1 and 2, there is shown a portable sound recording and/or reproducing device, such as a phonograph P, which comprises a preferably rectangular upper wall or cover 1. This upper wall is integrally formed with four side walls 2 which are perpendicular to its general plane and which, together with the upper wall, constitute the upper shell of the phonograph casing. The lower shell of the casing consists of a plate-like bottom wall **1*a* (see FIG. 2) which is integral with upstanding side walls 1*b*, the latter surrounding the downwardly extending side walls 2 of the upper wall 1. Both shells are preferably made of a suitable thermoplastic material. FIG. 1 shows the upper shell 1, 2 from its underside with the lower or bottom shell 1*a*, 1*b* removed. The upper wall 1 is formed with a downwardly extending cup-shaped depression 3 which receives the turntable 4**, the latter preferably consisting of a suitable cast metal and its diameter approximating the diameter of the label-carrying central portion of a disk record R (see FIG. 2).

The turntable 4 is rotatably mounted on a coaxial shaft 5 whose lower end portion extends through the discoid bottom **3*a* of the depression 3 and is secured thereto by a pair of nuts 5*a*, 5*b*. In order to reduce the frictional forces developing between the turntable 4 and the shaft 5, the latter's upper end is formed with a shallow recess to receive a ball 6 which is in contact with an elongated bearing sleeve 4*a* inserted into the upwardly extending coaxial blind bore of the turntable 4. The ball 6 constitutes a thrust bearing and takes up axial forces between the shaft 5 and the turntable. The lower peripheral edge portion 18 of the turntable is engageable by the butt shaft 7 of a variable-speed electric motor 8 so that the latter may rotate the turntable at the required r.p.m. of the disk record R when the record is placed onto the upper side of the turntable. The motor 8 is resiliently mounted on and depends from the underside of the upper wall 1 in such manner that it can perform tilting movements about a horizontal axis which is substantially perpendicular to the axis of its shaft 7**.

One end of the composite tone arm 9 is mounted on a bolt 10 in such a way that it may be swung in a plane which is parallel with the general plane of the upper wall 1, the bolt 10 having its upper end fixed to and extending downwardly from the underside of the upper wall toward the bottom wall **1*a*. The magnetic or needle-bearing tone head 11 of the tone arm 9 is extendable through an opening 12 in the upper wall 1 to bring its record-contacting element, e.g. a needle or stylus 40, into contact with the underside or lower surface of a record R, i.e. the head 11 is pivotal with respect to the tone arm 9 upwardly above and is retractable downwardly and beneath the underside of the wall 1. When the phonograph P is not in use, the opening 12 is sealable by a shutter 13**.

The diameters of disk records which may be utilized in the improved phonograph must exceed the diameter of the turntable 4 so that the underside of a record placed onto the turntable extends over the adjacent opening 12. As is shown in FIG. 1, the tone head 11 is always located beneath the opening 12 but may be pivoted by tone arm 9 about the vertical axis of the bolt 10 radially toward and away from the side wall **3*b* of the depression 3 in which the turntable is mounted. The head 11 may move between the side walls 2' and 3*b***.

The turntable 4 is prevented from performing axial movements with respect to the shaft 5 by an angular, preferably Z-shaped retaining member 14 one leg of which is adjustably secured to the bottom wall **3*a* of the depression 3 by means of a screw 17. The bottom wall 3*a* is formed with an elongated closed slot 16 which permits movements of the screw 17 radially toward and away from the shaft 5. If it should become necessary to remove the turntable 4, the screw 17 is loosened and is thereupon slid radially outwardly in the cutout 16 in order to remove the other leg of the retaining member 14 from a peripheral groove 15*a* which is formed in the hollow coaxial downwardly extending boss 15 of the turntable 4. The lower edge portion 18 of the turntable which extends into the depression 3 consists of a removable annular friction lining whose upper edge is formed with an inwardly extending annular flange receivable in a suitable peripheral groove of the turntable 4. The dimensions of the retaining member 14 and the position of annular groove 15*a* are selected in such a way that the lining 18 may be engaged with a requisite frictional force by the polished driving shaft 7 of the motor 8. The annular side wall 3*b* and the bottom wall 3*a* of the depression 3 are formed with a cutout 24 for the passage of the driving shaft 7. The outer or upper side of the turntable 4 is formed with a recessed annular surface 19 surrounding the coaxial hub 22 which latter extends through the customary central aperture C of a record R, the latter being shown in phantom lines in FIG. 2. The annular surface 19, in turn, is formed with an annular recess 20 which is close to the periphery of the turntable and receives an elastic plastic ring 21 of preferably U-shaped cross-sectional contour. The ring 21 may be held in the recess 20 merely by friction or it may be glued or otherwise secured to the turntable 4. Its pointed annular uppermost edge serves as a support for the underside of the disk record R. The aperture C of the record receives the hub 22, and the record is releasably held in required position by three or more preferably uniformly spaced, radially outwardly biased retaining balls 23. The balls 23 are slidably inserted into and are retained in radial blind bores 22*a* formed in the periphery of the hub 22, and are constantly urged in outward direction by helical expansion springs 23*a*. The axial distance between the centers of uniformly spaced retaining spheres 23 and the record-supporting annular edge of the ring 21 corresponds substantially to the thickness of a disk record so that the latter is properly held in position against the upward pressure of the tone head 11** when the phonograph is in actual use. It will be noted that the supporting ring 21 as well as the hub 22 extend beyond the upper side of the wall 1.

The retaining members 23 could be replaced by a suitable weight placed onto the central portion of a disk record. However, such construction is less desirable because the weight might become displaced, particularly when the improved phonograph is of the portable type.

The motor 8 is rigidly connected with a pair of L-shaped brackets 25, 26 each of which is pivotally fixed to one of two lugs 27 forming part of a bearing plate 28 so that the motor may pivot about the common axis of two horizontal pins 27*a* which connect the lugs 27 with the brackets 25, 26, respectively. As is shown in FIG. 2, the brackets 25, 26 are located at that side of the motor 8 which is closer to the turntable 4 so that the motor tends to pivot by its own weight in the direction indicated by the arrow 29 whereby the driving shaft 7 bears with a required pressure against the friction lining 18. In other words, the mounting of the motor for pivotal movements about the common horizontal axis of pins 27*a* which are parallel with the general plane of the cover 1 and perpendicular to the axis of shaft 7 is such that the motor by its own weight controls the pressure at which its driving shaft 7 engages the lining 18, it being assumed that the phonograph P rests on the exposed underside of its bottom wall 1*a* when put to actual use. The bearing plate 28 is resiliently mounted on and depends from the underside of the upper wall 1. It is secured thereto by four downwardly extending headed bolts 31 each of which mounts a pair of expansion springs 30, one of each pair of springs operating between the underside of the bearing plate 28 and the head of the respective bolt 30, and the other of each pair of springs operating between the upper side of the bearing plate 28 and the underside of the upper wall 1.

Figure 6:
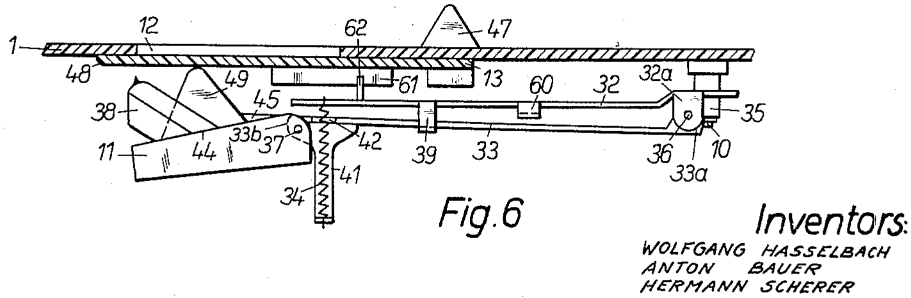
FIG. 6 shows the tone arm in retracted position in which the aforementioned opening is sealed by the shutter.

Referring now in greater detail to FIGS. 5 and 6, the tone arm 9 comprises two components in the form of levers 32, 33 the latter of which is movable toward the lever 32 in a vertical plane perpendicular to the general plane of the upper wall 1. The lower lever 33 is constantly biased in a direction upwardly and toward the upper lever 32 by a helical spring 34 one end of which is connected to the upper lever 32 and the other end of which is anchored in the bottom of a tubular spring housing 41 connected to and extending from the underside of the lower lever 33. The spring 34 extends through an aperture 42 formed in the lower lever 33 above the open upper end of housing 41 and constantly tends to move the lower lever toward the upper lever. The end of the horizontal upper lever 32 is rigidly fixed to a sleeve 35 which is rotatably mounted on the bolt 10 so that the lever 32 is swingable about the vertical axis of the bolt 10 in a plane substantially parallel with the general plane of the upper wall 1. However, the sleeve 35 prevents any movements of the lever 32 in directions other than in parallelism with the wall 1. Adjacent to the sleeve 35, the levers 32, 33 are formed with oppositely inclined pairs of leaves 32*a*, 33*a* which are connected to each other by pins 36 so that the lower lever 33 is swingable about the common horizontal axis of the pins 36 upwardly toward and downwardly away from the upper lever 32, the downward movements of the lower lever being carried out against the bias of expansion spring 34. The two pairs of leaves 32*a*, 33*a* and the two pins 36 constitute a hinge which articulately connects the lower lever 33 to the upper lever. The lower lever 33 constitutes the main component of the tone arm and participates in all movements of the upper lever 32 about the vertical axis of the bolt 10. The forward end of the lower lever 33 extends beyond the upper lever 32 and is formed with a pair of downwardly extending brackets 33*b* which mount a horizontal pin 37 pivotally supporting the tone head 11 together with the pickup 38. The lower lever 33 and the tone head 11 are pivotable about the common horizontal axis of pins 36 to the extent determined by a U-shaped stop member or bracket 39 which is fixed to and extends downwardly from a medium portion of the upper lever 32 in such a way as to surround the adjacent portion of the lower lever. The movements of parts 33, 11 with respect to the upper lever 32 to the extent controlled by the stop member 39 are sufficient to properly hold the needle 40 in a groove of the disk record R even if the latter is slightly deformed or if it should flutter on the hub 22 of the turntable 4. The actual pressing force with which the needle 40 is urged into contact with the bottom of a sound groove on the underside of the record R is determined by the spring 34, and the extent of pivotal movements of lower lever 33 about the pins 36 is selected in such a way that the optimum pressing force is neither exceeded nor reduced to an appreciable extent regardless of the uneven mounting or deformation of the record R.

The horizontal pivot pin 37 also mounts a coiled spring 43 (see FIG. 1) which constantly tends to pivot the tone head 11 in clockwise direction whereby the upper edge 44 of the head 11 moves into abutment with a lateral stop lug or abutment means 45 of the upper lever 32. However, the edge 44 can move into abutment with the lug 45 only when the shutter 13 is in the open position of FIG. 5, i.e. when it exposes the opening 12 in the upper wall 1. The spring 43 then pivots the needle 40 upwardly and beyond the upper side of the wall 1 so that the needle may enter a groove in the underside of the record R under the bias of the spring 34.

As is shown in FIG. 1, the upper wall 1 is formed with an elongated narrow guide slot 46 for the upwardly extending actuating handgrip member 47 of the shutter 13 by means of which the shutter may be moved into and between the positions of FIGS. 5 and 6, i.e. into exposing and sealing positions, respectively. The forward edge of the shutter 13 is formed with a cam in the form of a rearwardly and downwardly inclined cam surface 48; the purpose of this cam surface is to engage and to depress the upwardly extending follower or flap 49 of the tone head 11 and to pivot the entire tone head into the casing of the phonograph P (FIG. 6) when the shutter 13 is moved into the sealing position. Because the tip of the follower 49 is located between the horizontal pivot pin 37 and the pickup 38, the sensitive needle 40 cannot come into contact with the shutter 13 when the latter moves into the position of FIG. 6 in which it seals the opening 12. The pivotal movements of the head 11 under the action of the arcuate cam surface 48 are performed against the bias of the resilient element 43 as soon as the lower component 33 of the tone arm reaches its lowermost position in which it abuts against the stop member 39, i.e. in the initial stage of engagement between the cam 48 of the shutter 13 and follower 49 the lower component 33 and the tone head 11 form a rigid unit and the tone head begins to pivot about the horizontal pin 37 only after the lower component 33 comes into abutment with the stop member 39. This is due to the fact that the resilient element 34 is much weaker than the resilient element 43; therefore, the pivotal movement of the lower component 33 about the horizontal pins 36 and against the bias of the resilient element 34 must be completed before the tone head 11 can pivot with respect to the lower component 33 and against the bias of the stronger resilient element 43. While the tone head 11 pivots about the horizontal pin 37, its edge 44 moves downwardly and away from the stop lug 45 of the upper component 32 (see FIG. 6). The pins 36 are preferably parallel with the pin 37.

The brackets 33*b* and the pin 37 constitute a second hinge which articulately connects the tone head 11 to the lower component or lever 33. The feature that the tone arm 9 is formed as a two-piece member whose components 32, 33 are connected to each other by a horizontal hinge 32*a*, 33*a*, 36 and that another horizontal hinge 33*b*, 37 permits pivotal movements of the tone head 11 into an operative or exposed position and into an inoperative or retracted position renders it possible to conveniently accommodate in a very small casing a schematically represented storage battery 50 for the motor 8 which battery is shown in phantom lines in FIG. 5. The storage battery 50 preferably comprises a series of monocells of any known design. The stop member 39 constitutes a means which limits the movements of the lower component 33 with respect to the upper component 32. Since the two components may be made of flat, preferably metallic material, the tone arm 9 occupies very little space particularly because the lower component 33 must perform only very limited movements with respect to the upper component 32. In their preferred form, the components 32, 33 are stamped from a metallic sheet.

As is clearly shown in FIG. 2, the depth of the casing is determined by the dimensions and mounting of the motor 8 because the tone arm 9 and the walls *3a*, *3b* of the depression for the turntable are rather closely adjacent to the wall 1.

Figure 4:
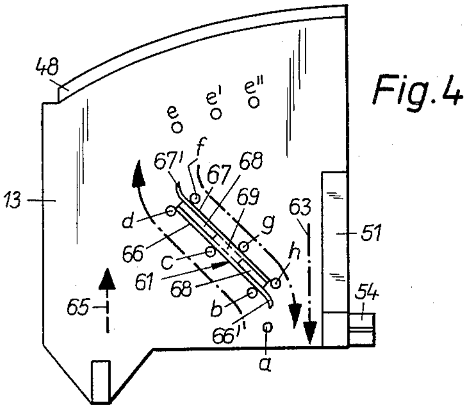
FIG. 4 is a bottom plan view of the hand-operated shutter which alternately exposes and conceals the head of the tone arm and which performs a series of additional functions, such as starting the driving motor for the turntable, causing the tone arm and its head to pivot in two planes which are perpendicular to each other, and certain other functions.

The shutter 13 is the sole element of our improved phonograph which must be actuated by hand. As stated hereinbefore, this shutter not only exposes and seals the opening 12 for the tone head 11 but also performs a number of additional controlling functions, among others pivoting of the tone head 11 from the position of FIG. 5 into the position of FIG. 6. Furthermore, the movements of the shutter 13 are utilized for pivoting the entire tone arm 9 in a horizontal plane into the initial or starting position of FIG. 3, i.e. into a position in which the needle 40 is located beneath the outermost convolution of the groove at the underside of the disk record R. Still further, the shutter completes the electric circuit of the motor 8 and battery 50, and relieves the pressure between the elements of the friction drive 7, 18 when the phonograph is not in actual use. Such additional functions are performed by a series of cams which are provided at the underside of the shutter 13, i.e. at that side which is turned toward the bottom wall **1*a*. These cams are shown in FIG. 4. The aforementioned arcuate cam surface 48 of the shutter constitutes the first of four cams carried by this member and, as fully explained hereinabove, together with the follower 49 and with resilient elements 34, 43 brings about pivotal movements of the tone head 11 into and between the positions of FIGS. 5 and 6. The length and the configuration of this cam surface 48 is selected in such a way that it may engage the flap or follower 49 regardless of the momentary angular position of the tone arm 9 with respect to the bolt 10, i.e. regardless of whether the tone arm is in the outermost position of FIG. 3 or in the innermost position of FIG. 1. This can be readily observed in FIGS. 1 and 3 which show that the arcuate cam surface 48 extends all the way across the opening 12. The curvature of the cam surface 48 is selected in such a way that the tone arm 9 does not move about the bolt 10 when the follower 49 is engaged by the cam surface because such movements of the tone arm would scratch the underside of the record R or would damage the sensitive pickup assembly 38. The center of curvature of the cam surface 48 coincides with or is close to the vertical axis of the bolt 10 so that the lower lever 33 of the tone arm pivots about the horizontal pivot pins 36 or that the tone head 11 pivots about the pivot pin 37 whenever the cam surface 48 engages with the follower 49**.

At the right-hand side of the shutter 13 (see FIG. 4), there is provided a second cam in the form of an inclined cam surface 51 which, when the shutter moves into the sealing position of FIG. 6, engages and pivots the arcuate arm member 52, the latter constituting a rigid extension of the left-hand bracket 26 which pivotally mounts the motor 8 on the left-hand pin 27. The cam surface 51 pivots the arm member 52 and the motor 8 in a direction counter to the direction indicated by the arrow 29 (see FIG. 2) whereby the driving shaft 7 moves away from operative engagement with the friction lining 18 on the turntable 4. Thus, when the shutter 13 is in the sealing position, its cam surface 51 and the arm member 52 relieve the pressure between the lining 18 and the driving shaft 7, the motor 8 being maintained in such position against the bias of certain of the coil springs 30 as will be readily understood by reference to FIGS. 1 and 2. As is shown in FIGS. 1 and 7, the outer end portion of the arm member 52 is bent into substantial parallelism with the shutter 13, as at **52*a*, and carries an adjustable element 53 which latter comes into actual contact with the inclined cam surface 51. By adjusting the position of the element 53 with respect to the bent end portion 52*a* of the arm member 52, an operator may control the extent to which the drive shaft 7 is pivoted away from the lining 18 when the shutter 13 moves into the sealing position of FIG. 6. The movements of the shaft 7 away from the lining 18** during non-use of the phonograph are considered necessary because the shaft would leave chatter marks in the softer material of the lining during an extended idleness of the apparatus.

Figure 8:
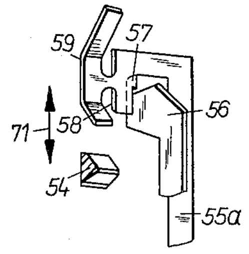
FIG. 8 is an enlarged perspective view of certain components of the switch means in the circuit of the electric motor which rotates the turntable.

Adjacent to the inclined cam surface 51, the shutter 13 carries a laterally extending guide cam 54 which is adapted to engage a contact spring **55*a*, the latter assuming the shape of an elongated leaf spring and forming part of a switch assembly 55 which alternately completes and interrupts the electric circuit of the motor 8. The other contact spring 56 also assumes the form of an elongated leaf spring and is engaged by the spring 55*a* when the shutter 13 moves into the position of FIG. 5 in which it exposes the opening 12 and permits the tone head 11 to project upwardly and beyond the upper side of the wall 1. The exact configuration of leaf springs 55*a*, 56 is best shown in FIG. 8. It will be seen that the planes of these springs are perpendicular to each other and that the springs are formed in such a manner that they releasably interlock in a fully automatic way when the guide cam 54 moves in the direction of the arrow 71, i.e. into engagement with and beyond the substantially U-shaped slider or terminal 59 of the leaf spring 55*a*, the guide cam 54 moving in the direction of arrow 71 when the shutter 13 is pushed by hand into the position of FIG. 5, i.e. in the direction of arrow 63 incidated in FIG. 4. The automatic interlocking of leaf springs 55*a*, 56 is brought about by a finger 57 on the spring 56 (shown in broken lines in FIG. 8) which engages with a lip 58 of the other leaf spring 55*a*. The finger 57 comes into actual engagement with the lip 58 at the time when the guide cam 54 engages the terminal portion 59 of the spring 55*a* and while the shutter 13 moves into the exposing position of FIG. 5. During such advance of the guide cam 54 (arrow 71), the latter actually lifts the spring 55*a* over the finger 57. FIG. 3 shows the springs 55*a*, 56 in operative engagement; it will be noted that the guide cam 54 is moved beyond and away from the terminal portion 59, i.e. the circuit of the motor 8 is now completed and the driving shaft 7 imparts a rotary movement to the lining 18 and to the turntable 4**.

FIG. 1 illustrates that position of the tone arm 9 in which the playing of the record R is completed and the needle 40 is located in the innermost convolution of the groove at the underside of the record R. At such time, the leaf spring **55*a* of the switch 55 must be separated from the leaf spring 56 to interrupt the electric circuit and to arrest the motor 8. This is brought about by a laterally extending substantially horizontal interrupter member or finger 60 which is connected to or integral with the upper lever 32 of the tone arm 9. As soon as the needle 40 enters the innermost groove at the underside of a disk record mounted on the hub 22 of the turntable 4, the interrupting member 60 engages the leaf spring 56 and separates the lip 58 from the finger 57** whereby the spring 56 automatically returns into the position of FIG. 1 in which it is out of contact with the spring 55*a*. It will be noted that the spring 56 is located in a vertical plane and that the actuating finger 60 moves in a horizontal plane; the latter is held against any other movements by virtue of its connection to the horizontal upper lever 32 which can only perform a movement about the vertical axis of the bolt 10.

The shutter 13 carries at its underside a fourth cam 61 which assumes the shape of a slider and whose purpose is to pivot the tone arm 9 about the vertical axis of the bolt 10 into the starting position of FIG. 3 whenever the shutter moves in a direction to expose the opening 12, i.e. when the shutter is pushed from the position of FIG. 6 into the position of FIG. 5. The cam 61 cooperates with a follower pin 62 which is connected to and extends upwardly from the upper side of the upper lever 32, i.e. the cam 61 and the follower 62 bring about movements of the tone arm 9 in a horizontal plane about the bolt 10. Various positions of the follower pin 62 are shown in FIG. 4 projected onto the underside of the shutter 13. By considering these positions in conjunction with FIGS. 1 and 3, the action of the cam 61 upon the tone arm can be readily traced in the drawings. When the shutter is in the sealing position of FIG. 6, the follower pin 62 assumes the position *a* which corresponds to the position of the tone arm 9 as shown in FIG. 1. When the shutter is moved in the direction of the phantom-line arrow 63 toward and into the position of FIG. 5, i.e. when it moves in a direction to expose the opening 12, the follower pin 62 must move the tone arm into the initial position of FIG. 3 in which the needle 40 is located beneath the outermost groove at the underside of the record R. In such outermost position, the tone arm 9 is arrested by a lateral conically shaped stop 64 which is connected to the tone head 11 and extends from the latter in a direction away from the turntable 4. This stop 64 comes into abutment with the side wall 2′ of the upper shell of the phonograph casing at such time when the needle 40 is in requisite position beneath the outermost convolution of the groove at the underside of a disk record. The stop 64 comes into abutment with the wall 2′ before the cam surface 48 slides away from the follower 49, i.e. before the tone head 11 can extend through the opening 12. In this manner, the stop 64 and the side wall 2′ guide the tone head 11 in its movement from the position of FIG. 6 into the position of FIG. 5 in order to advance the needle 40 into the outermost convolution of the record groove. The movement of the tone arm 9 from the position of FIG. 1 into the position of FIG. 3 is brought about by the cam 61 which guides the follower pin 62 from the latter's innermost position *a* (tone arm in the position of FIG. 1) through the intermediate positions *b*, *c*, *d* into the outermost position *e* (tone arm in the position of FIG. 3 and the tip of the stop 64 in abutment with the side wall 2′). As explained hereinabove, the movement of the shutter 13 from the position of FIG. 6 into the position of FIG. 5 brings about a gravitational pivoting movement of the motor 8 into the position of FIG. 2 (arrow 29) whereby the driving shaft 7 again engages with the linine 18, and the guide cam 54 simultaneously moves the leaf spring 56 into interlocking engagement with the leaf spring 55*a* so that the switch 55 completes the circuit of the motor and the turntable 4 spins the disk record even before the needle 40 actually enters the outermost convolution of the record groove. The record R rests on the annular edge of the supporting ring 21 and is held against the bias of the spring 34 by the snap action of retaining balls 23.

If the user desires to interrupt the operation of the phonograph P before the playing of a selected disk record R is completed, i.e. when the tone arm 9 assumes an intermediate position between the end positions of FIGS. 3 and 1, he merely pushes the shutter 13 from the position of FIG. 5 back into the position of FIG. 6 to seal the opening 12 and to retract the tone head 11 into the phonograph casing. During such return movement of the shutter 13 into its sealing position, the inclined cam surface 51 engages with the arm member 52 and pivots the motor 8 about the common horizontal axis of pins 27*a* to move the driving shaft 7 away from the friction lining 18, but the circuit of the motor remains completed because the interrupter finger 60 is still out of contact with the leaf spring 56 and the guide cam 54 merely slides above the slider 59 without separating the lip 57 from the finger 58. However, it is desirable that the tone arm 9 return into the position of FIG. 1 whenever the shutter 13 is moved into its sealing position. Such movement of the tone arm cannot be carried out by the arcuate cam surface 48 because, and as explained hereinabove, any radial movements of the tone arm with respect to the turntable 4 and disk record R while the needle 40 is still received in the latter's groove would scratch the underside of the record and could damage the pickup assembly 38. Therefore, the cam 61 must be formed in such a way that it automatically returns the tone arm from an intermediate position into the position of FIG. 1 in which the tone arm abuts against the annular side wall 3*b* of the depression 3. This is shown in FIG. 4 wherein the arrow 65 indicates the direction in which the shutter 13 moves into sealing position. Assuming that the follower pin 62 is still close to the outermost position *e*, i.e. that the user desires to arrest the rotation of turntable 4 immediately or shortly after the needle 40 enters the outermost convolution of the groove at the underside of the disk record R, the cam 61 advancing in the direction of the arrow 65 engages the follower pin 62 and moves the latter from the position *e* through the positions *f*, *g*, *h* back into the initial or innermost position *a* in which the tone arm 9 abuts against the side wall 3*b*. When the shutter 13 is moved into sealing position after the follower pin 62 already advances into the intermediate position *e′* (i.e. when the needle 40 is automatically advanced a given distance toward the center of the record R), the cam 61 again engages the follower pin and moves the same through the positions *g*, *h* back into the position *a*. When the pin 62 already reaches the advanced intermediate position *e″*, it is returned through the position *h* back into the position *a* as soon as the shutter 13 is pushed in the direction of the arrow 65. It will be noted that the inclination of the elongated cam 61 with respect to the direction of arrow 65 is such that the left-hand side of the cam cooperates with the follower pin 62 to move the tone arm 9 into the position of FIG. 3 in which the stop 64 abuts against the side wall 2′, and that the right-hand side of the cam 61 cooperates with the pin 62 to move the tone arm from an intermediate position back into the idle or innermost position of FIG. 1. The inclination of the elongated cam 61 with respect to the direction in which the shutter 13 is moved between its sealing and exposing positions does not substantially exceed 45 degrees and is preferably less than 45 degrees. As soon as the cam 61 returns the tone arm into the position of FIG. 1, the interrupter member 60 separates the lip 58 from the finger 57 and arrests the motor 8. Such movements of the follower pin 62 are possible owing to the specific construction of the cam 61 in that the latter comprises a pair of elongated resilient leaf springs 66 and 67 which are substantially parallel to each other and are fixed in slightly spaced relation to the opposing sides of a central rib 68 which extends downwardly from the underside of the shutter 13. The springs 66, 67 extend downwardly and slightly beyond the rib 68 as well as horizontally beyond this rib, and are connected to each other by a short bridge 69. The tongue-like portions 66′, 67′ of the respective springs 66, 67 which extend horizontally and beyond the rib 68 are sufficiently resilient to yield to the follower pin 62 so that they cannot move the follower pin when the latter assumes the position *d* or *h*. However, when the pin 62 engages that portion of the spring 66 or 67 which is adjacent to the central rib 68, the springs cannot yield to the pressure of the follower pin 62 and move the latter into the position *e* or back into the position *a* depending upon whether the shutter moves into the position of FIG. 5 (arrow 63 in FIG. 4) or into the sealing position of FIG. 6 (arrow 65 in FIG. 4). Alternately, the underside of the shutter 13 could be provided with a cam groove for the follower pin 62 which groove would replace the cam 61; however, such arrangement is somewhat less convenient because it is more difficult to return the tone head 11 into the position of FIG. 1 when the tone arm is in an intermediate position.

It will be readily understood that the novel arrangement according to which the element 40 comes into engagement with the underside of a record is equally useful in a phonograph which is provided with an automatic record changer, i.e. in which the records are discharged from a magazine and are thereupon automatically ejected laterally of the turntable 4. In such constructions, the movements of the tone arm into the positions of FIGS. 1 and 3 may be controlled by the record changing mechanism. In addition, the shutter 13 which is reciprocable in its own plane may be replaced by a pivotable shutter or by a curtain like flexible shutter of the type resembling the shutter in certain photographic cameras and the like.

It will further be understood that each of the elements described above, or two or more together, may also find a useful application in other types of photographs differing from the types described above.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a phonograph, in combination, a casing comprising a horizontal upper wall having an upper side, an underside and an opening; shutter means slidable along said upper wall for sealing and exposing said opening; a turntable rotatably mounted in said wall adjacent to said opening and extending beyond the upper side of said wall, said turntable adapted to support a record in such manner that the underside of the record is turned toward the upper side of said wall and extends over said opening; means installed in said casing and drivingly connectable with the turntable for rotating the same; and a tone arm pivotally fixed to the underside of said wall for movements in a horizontal plane and comprising a tone head pivotable in a vertical plane whereby said tone head is adapted to be moved beneath and to project through said opening and to engage with the underside of said record.

2. In a phonograph, in combinaation, a casing comprising an upper wall having an upper side, an underside, and an opening; a turntable rotatably mounted in said casing and extending beyond the upper side of said wall, said turntable adapted to support a disk record in such a way that a surface of the record is turned toward the upper side of said wall; motor means installed in said casing and drivingly connectable with the turntable for rotating the same; a tone arm having a first end fixed to the underside of said wall and pivotable about said end in a first plane parallel with the plane of said wall, said tone arm having a second end and comprising a tone head located beneath said opening and fixed to said second end, said head pivotable in a second plane perpendicular to said first plane whereby the head is adapted to project through the opening into engagement with said record surface, said tone arm further comprising follower means extending toward the underside of said wall; and shutter means movable with respect to the underside of said wall between a first and a second position in which said opening is exposed and sealed respectively, said shutter means comprising cam means engageable with said follower means for pivoting the tone arm in said first plane in a direction to move said head substantially radially of and away from the turntable when the shutter means is moved toward said first position, and for pivoting the tone arm in said first plane in a direction to move said head substantially radially of and toward said turntable when the shutter means is moved toward said second position.

3. In a phonograph, in combination, a casing comprising an upper wall having an upper side, an underside, and an opening; a turntable rotatably mounted in said casing and extending beyond the upper side of said wall, said turntable adapted to support a disk record in such a way that a surface of the record is turned toward the upper side of said wall; motor means installed in said casing and drivingly connectable with the turntable for rotating the same; a tone arm having a first end fixed to the underside of said wall and pivotable about said end in a first plane parallel with the plane of said wall, said tone arm having a second end and comprising a tone head located beneath said opening and fixed to said second end, said head pivotable in a second plane perpendicular to said first plane whereby the head is adapted to project through the opening into engagement with said record surface, said tone arm further comprising follower means extending toward the underside of said wall; and shutter means movable with respect to the underside of said wall between a first and a second position in which said opening is exposed and sealed respectively, said shutter means comprising cam means engageable with said follower means for pivoting the tone arm in said first plane when the shutter means is moved between said first and second positions.

4. In a phonograph, in combination, a casing comprising an upper wall having an upper side, an underside, and an opening; a turntable rotatably mounted in said casing and extending beyond the upper side of said wall, said turntable adapted to support a disk record in such a way that a surface of the record is turned toward the upper side of said wall; motor means installed in said casing and drivingly connectable with the turntable for rotating the same; a tone arm having a first end fixed to the underside of said wall and pivotable about said end in a first plane parallel with the plane of said wall, said tone arm having a second end and comprising a tone head located beneath said opening and fixed to said second end, said head pivotable in a second plane perpendicular to said first plane whereby the head is adapted to project through the opening into engagement with said record surface, said tone arm further comprising follower means extending toward the underside of said wall; and shutter means movable with respect to the underside of said wall between a first and a second position in which said opening is exposed and sealed respectively, said shutter means comprising cam means engageable with said follower means for pivoting the tone arm in said first plane in a direction to move said head substantially radially of and away from the turntable when the shutter means is moved toward said first position, and for pivoting the tone arm in said first plane in a direction to move said head substantially radially of and toward said turnable when the shutter means is moved toward said second position, said cam means inclined through less than 45 degrees with respect to the direction in which the shutter means is movable between said first and second position.

5. In a phonograph, in combination, a casing comprising an upper wall having an upper side, an underside, and an opening; a turntable rotatably mounted in said casing and extending beyond the upper side of said wall, said turntable adapted to support a disk record in such a way that a surface of the record is turned toward the upper side of said wall; motor means installed in said casing and drivingly connectable with the turntable for rotating the same; a tone arm having a first end fixed to the underside of said wall and pivotable about said end in a first plane parallel with the plane of said wall, said tone arm having a second end and comprising a tone head located beneath said opening and fixed to said second end, said head pivotable in a second plane perpendicular to said first plane whereby the head is adapted to project through the opening into engagement with said record surface, said tone arm further comprising a follower pin extending upwardly toward the underside of said wall; and shutter means movable with respect to the underside of said wall between a first and a second position in which said opening is exposed and sealed respectively, said shutter means comprising cam means engageable with said follower pin for pivoting the tone arm in said first plane in a direction to move said head substantially radially of and away from the turntable when the shutter means is moved toward said first position, and for pivoting the arm in said first plane in a direction to move said head substantially radially of and toward said turntable when the shutter means is moved toward said second position, said cam means comprising two elongated leaf springs each inclined through an angle not substantially exceeding 45 degrees with respect to the direction in which the shutter means is movable between said first and second positions, one of said leaf springs engaging the follower pin when the shutter means is moved toward said first position and the other leaf spring engaging the follower pin when the shutter means is moved toward said second position.

6. In a phonograph, in combination, a casing comprising an upper wall having an upper side, an underside, and an opening; a turntable rotatably mounted in said casing and extending beyond the upper side of said wall, said turntable adapted to support a disk record in such a way that a surface of the record is turned toward the upper side of said wall; electric motor means installed in said casing and drivingly connectable with the turntable for rotating the same; normally open switch means in the circuit of said motor means; a tone arm fixed to the underside of said wall for pivotal movements in a first plane parallel with the plane of said wall, said tone arm comprising a head located beneath said opening and pivotable in a second plane perpendicular to said first plane whereby the head is pivotable by said tone arm beneath said opening and is adapted to project through said opening into engagement with said record surface; and shutter means movable along the underside of said wall between a first and a second position in which said opening is exposed and sealed, respectively, said shutter means comprising cam means engaging with and closing said switch means to complete the circuit of and to start said motor means when the shutter means is moved toward said first position.

7. In a phonograph, in combination, a casing comprising an upper wall having an upper side, an underside, and an opening; a turntable rotatably mounted in said casing and extending beyond the upper side of said wall, said turntable adapted to support a disk record in such a way that a surface of the record is turned toward the upper side of said wall; electric motor means installed in said casing and drivingly connectable with the turntable for rotating the same; normally open switch means in the circuit of said motor means; a tone arm fixed to the underside of said wall for pivotal movements in a first plane parallel with the plane of said wall, said tone arm comprising a head located beneath said opening and pivotable in a second plane perpendicular to said first plane whereby the head is pivotable by said tone arm beneath said opening and is adapted to project through said opening into engagement with said record surface, said tone arm further comprising follower means extending toward the underside of said wall; and shutter means movable along the underside of said wall between a first and a second position in which said opening is exposed and sealed, respectively, said shutter means comprising first cam means engaging with and closing said switch means to complete the circuit of and to start said motor means when the shutter means is moved toward said first position, and second cam means engageable with said follower means for pivoting the tone arm in said first plane in a direction to move said head substantially radially of and away from the turntable when the shutter means is moved toward said first position and for pivoting the tone arm in a direction to move the head substantially radially of and toward said turntable when the shutter means is moved toward said second position.

8. In a phonograph, in combination, a casing comprising a horizontal upper wall having an upper side, an underside and an opening; a turntable rotatably mounted in said wall adjacent to said opening and comprising record supporting means extending upwardly and beyond the upper side of said wall, the diameter of said turntable being smaller than the diameter of a disk record whereby a record placed onto the turntable extends beyond the same and above the opening in said wall; motor means installed in said casing and drivingly connectable with the turntable for rotating the same; and a tone arm fixed to the underside of said wall for pivotal movements about a vertical axis, said tone arm comprising an upper component including means restricting the same to pivotal movements in a horizontal plane about said vertical axis, a lower component pivotally fixed to the upper component in the proximity of said vertical axis and pivotable with respect to said upper component about a first horizontal axis, stop means for limiting the movement of said lower component about said first horizontal axis in a direction away from the upper component, first resilient means for constantly biasing the lower component in a direction toward the upper component, a tone head articulately connected to the lower component at a point distant from said vertical axis and located beneath said opening, said tone head pivotable with respect to the lower component about a second horizontal axis, and second resilient means constantly biasing the tone head in upward direction, the biasing action of said second resilient means being stronger than the biasing action of said first resilient means whereby the second resilient means is adapted to pivot the tone head about said second horizontal axis into engagement with said record surface and the first resilient means is adapted to yield and permits pivotal movements of the lower component and of the tone head about the first horizontal axis to compensate for flutter or deformation of the record.

9. In a phonograph, in combination, a casing comprising a horizontal upper wall having an upper side, an underside and an opening; a turntable rotatably mounted in said wall adjacent to said opening and comprising record supporting means extending upwardly and beyond the upper side of said wall, the diameter of said turntable being smaller than the diameter of a disk record whereby a record placed onto the turntable extends beyond the same and above the opening in said wall; motor means installed in said casing and drivingly connectable with the turntable for rotating the same; and a tone arm fixed to the underside of said wall for pivotal movements about a vertical axis, said tone arm comprising an upper component including means restricting the same to pivotal movements in a horizontal plane about said vertical axis, a lower component pivotally fixed to the upper component in the proximity of said vertical axis and pivotable with respect to said upper component about a first horizontal axis, stop means for limiting the movement of said lower component about said first horizontal axis in a direction away from the upper component, first resilient means for constantly biasing the lower component in a direction toward the upper component, a tone head articulately connected to the lower component at a point distant from said vertical axis and located beneath said opening, said tone head pivotable with respect to the lower component about a second horizontal axis parallel with said first horizontal axis, and second resilient means operating between said second component and said tone head for constantly biasing the tone head in upward direction, the biasing action of said second resilient means being stronger than the biasing action of said first resilient means whereby the second resilient means is adapted to pivot the tone head about said second horizontal axis into engagement with said record surface and the first resilient means is adapted to yield and permits pivotal movements of the lower component and of the tone head about the first horizontal axis to compensate for flutter or deformation of the record.

10. In a phonograph, in combination, a casing comprising a horizontal upper wall having an upper side, an underside and an opening; a turntable rotatably mounted in said wall adjacent to said opening and comprising record supporting means extending upwardly and beyond the upper side of said wall, the diameter of said turntable being smaller than the diameter of a disk record whereby a record placed onto the turntable extends beyond the same and above the opening in said wall; motor means installed in said casing and drivingly connectable with the turntable for rotating the same; a tone arm having a first end fixed to the underside of said wall for pivotal movements about a vertical axis, said tone arm having a second end; a tone head located beneath said opening and fixed to the second end of said tone arm for pivotal movement about a horizontal axis; resilient means constantly biasing the tone head in upward direction; follower means connected to and extending upwardly from said tone head; and shutter means mounted in said casing adjacent to the underside of said wall and movable between a first and a second position in which said opening is exposed and sealed, respectively, said shutter means adapted to engage said follower means to pivot the tone head against the bias of said resilient means when moved toward said second position, said tone head being pivotable by the resilient means upwardly and through said opening to engage with the record surface when the shutter means is moved into said first position.

11. In a phonograph, in combination, a casing comprising a horizontal upper wall having an upper side, an underside and an opening; a turntable rotatably mounted in said wall adjacent to said opening and comprising record supporting means extending upwardly and beyond the upper side of said wall, the diameter of said turntable being smaller than the diameter of a disk record whereby a record placed onto the turntable extends beyond the same and above the opening in said wall; motor means installed in said casing and drivingly connectable with the turntable for rotating the same; a tone arm having a first end fixed to the underside of said wall for pivotal movements about a vertical axis, said tone arm having a second end; a tone head located beneath said opening and fixed to the second end of said tone arm for pivotal movement about a horizontal axis; resilient means constantly biasing the tone head in upward direction; follower means connected to and extending upwardly from said tone head; and shutter means mounted in said casing adjacent to the underside of said wall and movable between a first and a second position in which said opening is exposed and sealed, respectively, said shutter means having a cam surface adapted to engage said follower means to pivot the tone head against the bias of said resilient means when the shutter means is moved toward said second position, said tone head being pivotable by the resilient means upwardly and through said opening to engage with the record surface when the shutter means is moved into said first position.

12. In a phonograph, in combination, a casing comprising a horizontal upper wall having an upper side, an underside and an opening; a turntable rotatably mounted in said wall adjacent to said opening and comprising record supporting means extending upwardly and beyond the upper side of said wall, the diameter of said turntable being smaller than the diameter of a disk record whereby a record placed onto the turntable extends beyond the same and above the opening in said wall; motor means installed in said casing and drivingly connectable with the turntable for rotating the same; a tone arm having a first end fixed to the underside of said wall for pivotal movements about a vertical axis, said tone arm having a second end; a tone head located beneath said opening and fixed to the second end of said tone arm for pivotal movement about a horizontal axis; resilient means constantly biasing the tone head in upward direction; follower means connected to and extending upwardly from said tone head; and shutter means mounted in said casing adjacent to the underside of said wall and movable between a first and a second position in which said opening is exposed and sealed, respectively, said shutter means having an arcuate cam surface adapted to engage said follower means to pivot the tone head against the bias of said resilient means when the shutter means is moved toward said second position, said cam surface having a center of curvature substantially coinciding with said vertical axis, said tone head being pivotable by the resilient means upwardly and through said opening to engage with the record surface when the shutter means is moved into said first position.

13. In a phonograph, in combination, a casing comprising a horizontal upper wall having an upper side, an underside, and an opening; a turntable rotatably mounted in said casing adjacent to said opening and extending beyond the upper side of said wall, the diameter of said turntable being smaller than the diameter of a disk record whereby a record placed onto said turntable overlaps the same and extends over said opening; an electric motor comprising a driving shaft, said motor pivotally fixed to the underside of said wall and swingable by its own weight about a horizontal axis into a position in which the driving shaft frictionally engages with said turntable and rotates the same when driven by said motor; a normally open switch in the circuit of said motor; a tone arm having a first end fixed to the underside of said wall for pivotal movement about a vertical axis and a second end; a tone head located beneath said opening and fixed to the second end of said tone arm for pivotal movement about a horizontal axis; resilient means constantly biasing the tone head in such manner that the head tends to pivot in upward direction and through said opening; a shutter mounted in the casing and movable along the underside of said wall between a first and second position in which said opening is exposed and sealed, respectively; a follower fixed to and extending upwardly from said tone head; a first cam on said shutter adapted to engage with said follower and to pivot the tone head against the bias of said resilient means; a second cam on said shutter adapted to close said switch and to complete the circuit of said motor when the shutter is moved toward said first position; an interrupter member connected to said tone arm and adapted to engage and to open said switch when the tone arm is pivoted about said vertical axis in a direction to move the tone head toward said turntable; an arm member connected to and pivotable with said motor; and a third cam on said shutter adapted to engage with said arm member and to pivot said motor in a direction to move the driving shaft away from said turntable when the shutter is moved toward said second position, said tone head projecting through the opening and into engagement with the underside of a record on said turntable when the shutter is moved into said first position.

14. In a phonograph, in combination, a casing comprising a horizontal upper wall having an upper side formed with a depression, an underside, an opening adjacent to said depression, and formed with a cutout communicating with said depression; a turntable rotatably mounted in said depression and extending beyond the upper side of said wall, the diameter of said turntable being smaller than the diameter of a disk record whereby a record placed onto said turntable overlaps the same and extends over said opening; an annular friction lining connected to said turntable in said depression and adjacent to said cutout; an electric motor comprising a driving shaft, said motor pivotally fixed to the underside of said wall and swingable by its own weight about a horizontal axis into a position in which the driving shaft extends through said cutout and engages with said lining for rotating the turntable when driven by said motor; a normally open switch in the circuit of said motor; a tone arm having a first end fixed to the underside of said wall for pivotal movement about a vertical axis and a second end; a tone head located beneath said opening and fixed to the second end of said tone arm for pivotal movement about a horizontal axis; resilient means constantly biasing the tone head in such manner that the head tends to pivot in upward direction and through said opening; a shutter mounted in the casing and movable along the underside of said wall between a first and second position in which said opening is exposed and sealed, respectively; a follower fixed to and extending upwardly from said tone head; a first cam on said shutter adapted to engage with said follower and to pivot the tone head against the bias of said resilient means; a second cam on said shutter adapted to close said switch and to complete the circuit of said motor when the shutter is moved toward said first position; an interrupter member connected to said tone arm and adapted to engage and to open said switch when the tone arm is pivoted about said vertical axis in a direction to move the tone head toward said turntable; an arm member connected to and pivotable with said motor; and a third cam on said shutter adapted to engage with said arm member and to pivot said motor in a direction to move the driving shaft away from said lining when the shutter is moved toward said second position, said tone head projecting through the opening and into engagement with the underside of a record on said turntable when the shutter is moved into said first position.

15. In a phonograph, in combination, a casing comprising a horizontal upper wall having an upper side, an underside, and an opening; a turntable rotatably mounted in said casing adjacent to said opening and extending beyond the upper side of said wall, the diameter of said turntable being smaller than the diameter of a disk record whereby a record placed onto said turntable overlaps the same and extends over said opening; an electric motor comprising a driving shaft, said motor pivotally fixed to the underside of said wall and swingable by its own weight about a horizontal axis into a position in which the driving shaft frictionally engages with said turntable and rotates the same when driven by said motor; a normally open switch in the circuit of said motor; a tone arm having a first end fixed to the underside of said wall for pivotal movement about a vertical axis and a second end; a tone head located beneath said opening and fixed to the second end of said tone arm for pivotal movement about a horizontal axis; resilient means constantly biasing the tone head in such manner that the head tends to pivot in upward direction and through said opening; a shutter mounted in the casing and movable along the underside of said wall between a first and second position in which said opening is exposed and sealed, respectively; a first and a second follower fixed to and extending upwardly from said tone head and from said tone arm, respectively; a first cam on said shutter adapted to engage with said first follower and to pivot the tone head against the bias of said resilient means; a second cam on said shutter adapted to close said switch and to complete the circuit of said motor when the shutter is moved toward said first position; an interrupter member connected to said tone arm and adapted to engage and to open said switch when the tone arm is pivoted about said vertical axis in a direction to move the tone head toward said turntable; an arm member connected to and pivotable with said motor; a third cam on said shutter adapted to engage with said arm member and to pivot said motor in a direction to move the driving shaft away from said turntable when the shutter is moved toward said second position; and a fourth cam on said shutter adapted to engage said second follower and to pivot the tone arm about said vertical axis in a direction to move the tone head radially of and away from said turntable when the shutter is moved toward said first position, said fourth cam adapted to engage said second follower and to pivot the tone arm about said vertical axis in a direction to move the tone head radially of and toward said turntable when the shutter is moved toward said second position whereby the interrupter member engages with and opens said switch, said resilient means automatically pivoting the tone head in upward direction through said opening and into engagement with the underside of a record placed onto said turntable when the shutter is moved into said first position whereby the third cam releases the arm member to permit pivotal movement of the motor into the position in which the shaft drivingly engages with said turntable and the second cam closes said switch whereby the motor is started and rotates the turntable together with a record placed thereon.

16. In a phonograph, in combination, a casing comprising a horizontal upper wall having an upper side, an underside, and an opening; a turntable rotatably mounted in said casing adjacent to said opening and extending beyond the upper side of said wall, the diameter of said turntable being smaller than the diameter of a disk record whereby a record placed onto said turntable overlaps the same and extends over said opening; an electric motor comprising a driving shaft, said motor pivotally fixed to the underside of said wall and swingable by its own weight about a horizontal axis into a position in which the driving shaft frictionally engages with said turntable and rotates the same when driven by said motor; a normally open switch in the circuit of said motor; a tone arm having a first end fixed to the underside of said wall for pivotal movement about a vertical axis and a second end; a tone head located beneath said opening and fixed to the second end of said tone arm for pivotal movement about a horizontal axis; resilient means constantly biasing the tone head in such manner that the head tends to pivot in upward direction and through said opening; a shutter mounted in the casing and movable along the underside of said wall between a first and second position in which said opening is exposed and sealed, respectively; a follower fixed to and extending upwardly from said tone head; a first cam on said shutter adapted to engage with said follower and to pivot the tone head against the bias of said resilient means; a second cam on said shutter adapted to close said switch and to complete the circuit of said motor when the shutter is moved toward said first position; an interrupter member connected to said tone arm and adapted to engage and to open said switch when the tone arm is pivoted about said vertical axis in a direction to move the tone head toward said turntable; an arm member connected to and pivotable with said motor; and an inclined cam surface formed at the underside of said shutter, said cam surface adapted to engage with said arm member and to pivot said motor in a direction to move the driving shaft away from said turntable when the shutter is moved toward said second position, said tone head projecting through the opening and into engagement with the underside of a record on said turntable when the shutter is moved into said first position.

17. In a phonograph, in combination, a casing comprising a horizontal upper wall having an upper side, an underside, and an opening; a turntable rotatably mounted in said casing adjacent to said opening and extending beyond the upper side of said wall, the diameter of said turntable being smaller than the diameter of a disk record whereby a record placed onto said turntable overlaps the same and extends over said opening; an electric motor mounted in said casing and drivingly connectable with said turntable for rotating the same; a switch in the circuit of said motor and mounted at the underside of said wall; a vertical bolt connected to and extending downwardly from the underside of said wall; a sleeve rotatably mounted on said bolt; a tone arm comprising a horizontal upper lever rigidly connected to and rotatable with the sleeve about said bolt, a lower lever having a first end fixed to the upper lever at a point adjacent to said sleeve for pivotal movement about a first horizontal axis, said lower lever having a second end extending beyond the upper lever, a first spring connected to said levers and constantly biasing the lower lever toward the upper lever, stop means carried by the upper lever for limiting the pivotal movement of the lower lever against the bias of said spring, a tone head connected to the second end of said lower lever for pivotal movement about a second horizontal axis, said tone head located beneath said opening, a second spring connected to the lower lever and constantly biasing the tone head in a direction upwardly and through said opening, the biasing action of said second spring being stronger than the biasing action of said first spring, and a first and second follower connected to and extending upwardly from said upper lever and from said tone head, respectively; and a shutter mounted in said casing and movable along the underside of said wall between a first and second position in which the opening is exposed and sealed, respectively, said shutter comprising a first and a second cam engageable with said first and second follower, respectively, said first cam and said first follower pivoting the tone arm about said bolt in directions to move the tone head radially toward and away from the turntable when the shutter moves into said second and first positions, respectively, and said second cam and said second follower pivoting the tone head against the bias of said springs when the shutter moves toward said second position, said tone head being automatically projected through said opening and into engagement with the underside of a record placed onto the turntable when the shutter is moved into said first position, said shutter further comprising a third cam adapted to close said switch and to complete the circuit of said motor when the shutter is moved toward said first position.

18. In a phonograph, in combination, a casing comprising a horizontal upper wall having an upper side, an underside, and an opening; a turntable rotatably mounted in said casing adjacent to said opening and extending beyond the upper side of said wall, the diameter of said turntable being smaller than the diameter of a disk record whereby a record placed onto said turntable overlaps the same and extends over said opening; an electric motor mounted in said casing and drivingly connectable with said turntable for rotating the same; a switch in the circuit of said motor and mounted at the underside of said wall; a vertical bolt connected to and extending downwardly from the underside of said wall; a sleeve rotatably mounted on said bolt; a tone arm comprising a horizontal upper lever rigidly connected to and rotatable with the sleeve about said bolt, a flat metallic lower lever having a first end fixed to the upper lever at a point adjacent to said sleeve for pivotal movement about a first horizontal axis, said lower lever having a second end extending beyond the upper lever and an aperture adjacent to said second end, a spring housing connected to and extending downwardly from said lower lever beneath said aperture, a first spring connected to said upper lever, extending through said aperture and connected to said housing for constantly biasing the lower lever toward the upper lever, stop means carried by the upper lever for limiting the pivotal movement of the lower lever against the bias of said spring, a tone head connected to the second end of said lower lever for pivotal movement about a second horizontal axis, said tone head located beneath said opening, a second spring connected to the lower lever and constantly biasing the tone head in a direction upwardly and through said opening, the biasing action of said second spring being stronger than the biasing action of said first spring, and a first and second follower connected to and extending upwardly from said upper lever and from said tone head, respectively; and a shutter mounted in said casing and movable along the underside of said wall between a first and second position in which the opening is exposed and sealed, respectively, said shutter comprising a first and a second cam engageable with said first and second follower, respectively, said first cam and said first follower pivoting the tone arm about said bolt in directions to move the tone head radially toward and away from the turntable when the shutter moves into said second and first positions, respectively, and said second cam and said second follower pivoting the tone head against the bias of said springs when the shutter moves toward said second position, said tone head being automatically projected through said opening and into engagement with the underside of a record placed onto the turntable when the shutter is moved into said first position, said shutter further comprising a third cam adapted to close said switch and to complete the circuit of said motor when the shutter is moved toward said first position.

19. In a phonograph, in combination, a casing comprising a horizontal upper wall having an upper side, an underside, and an opening; a turntable rotatably mounted in said casing adjacent to said opening and extending beyond the upper side of said wall, the diameter of said turntable being smaller than the diameter of a disk record whereby a record placed onto said turntable overlaps the same and extends over said opening; an electric motor mounted in said casing and drivingly connectable with said turntable for rotating the same; a switch in the circuit of said motor and mounted at the underside of said wall; a vertical bolt connected to and extending downwardly from the underside of said wall; a sleeve rotatably mounted on said bolt; a tone arm comprising a horizontal upper lever rigidly connected to and rotatable with the sleeve about said bolt, a lower lever having a first end fixed to the upper lever at a point adjacent to said sleeve for pivotal movement about a first horizontal axis, said lower lever having a second end extending beyond the upper lever, a first spring connected to said levers and constantly biasing the lower lever toward the upper lever, stop means carried by the upper lever for limiting the pivotal movement of the lower lever against the bias of said spring, a tone head connected to the second end of said lower lever for pivotal movement about a second horizontal axis, said tone head located beneath said opening, a second spring connected to the lower lever and constantly biasing the tone head in a direction upwardly and through said opening, the biasing action of said second spring being stronger than the biasing action of said first spring, an interrupter arm connected to and extending substantially horizontally from said upper lever, and a first and second follower connected to and extending upwardly from said upper lever and from said tone head, respectively; and a shutter mounted in said casing and movable along the underside of said wall between a first and second position in which the opening is exposed and sealed, respectively, said shutter comprising a first and a second cam engageable with said first and second follower, respectively, said first cam and said first follower pivoting the tone arm about said bolt in directions to move the tone head radially toward and away from the turntable when the shutter moves into said second and first positions, respectively, said interrupter arm engaging with and opening said switch to arrest the motor when the tone arm is pivoted by the shutter to move the tone head toward said turntable, and said second cam and said second follower pivoting the tone head against the bias of said springs when the shutter moves toward said second position, said tone head being automatically projected through said opening and into engagement with the underside of a record placed onto the turntable when the shutter is moved into said first position, said shutter further comprising a third cam adapted to close said switch and to complete the circuit of said motor when the shutter is moved toward said first position.

References Cited in the file of this patent

UNITED STATES PATENTS

| | | |
|---|---|---|
| 2,622,883 | Kurzen | Dec. 23, 1952 |
| 2,838,315 | Staar | June 10, 1958 |
| 2,967,715 | Black | Jan. 10, 1961 |

FOREIGN PATENTS

| | | |
|---|---|---|
| 848,272 | Germany | Sept. 1, 1952 |
| 834,147 | Germany | Mar. 17, 1952 |